United States Patent
Tanaka et al.

(10) Patent No.: US 7,244,774 B2
(45) Date of Patent: Jul. 17, 2007

(54) AQUEOUS DISPERSION FOR INKJET RECORDING

(75) Inventors: Nobushige Tanaka, Wakayama (JP); Koji Azuma, Wakayama (JP); Takehiro Tsutsumi, Wakayama (JP)

(73) Assignee: Kao Corporation, Tokyo (JP)

(*) Notice: Subject to any disclaimer, the term of this patent is extended or adjusted under 35 U.S.C. 154(b) by 340 days.

(21) Appl. No.: 10/895,140

(22) Filed: Jul. 21, 2004

(65) Prior Publication Data

US 2005/0020731 A1 Jan. 27, 2005

(30) Foreign Application Priority Data

Jul. 22, 2003 (JP) .............................. 2003-277812

(51) Int. Cl.
*C09D 11/02* (2006.01)
(52) U.S. Cl. .................... 523/160; 526/346; 526/307.7
(58) Field of Classification Search ................ 523/160; 526/346, 307.7
See application file for complete search history.

(56) References Cited

U.S. PATENT DOCUMENTS

| 6,031,019 A | * | 2/2000 | Tsutsumi et al. ........... 523/160 |
| 6,758,559 B1 | | 7/2004 | Nakano et al. |
| 2003/0132942 A1 | | 7/2003 | Obata et al. |

FOREIGN PATENT DOCUMENTS

| EP | 1 059 341 | 12/2000 |
| JP | 62-212403 | 9/1987 |
| JP | 4-311224 | 11/1992 |
| WO | WO 00/39226 | 7/2000 |

OTHER PUBLICATIONS

Patent Abstracts of Japan, JP 2002-338783, Nov. 27, 2002.
Patent Abstracts of Japan, JP 2001-123097, May 8, 2001 (corr. U.S. 6,758,559).
Patent Abstracts of Japan, JP 43-11224, 1968.

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

An aqueous dispersion for inkjet recording containing colorant-containing water-insoluble vinyl polymer particles dispersed in water, wherein the water-insoluble vinyl polymer contains a constitutive unit derived from a styrenic macromer (a) which has a polymerizable functional group at one end, wherein the styrenic macromer (a) has a number-average molecular weight of from 1000 to 5000 and a molecular weight distribution (weight-average molecular weight/number-average molecular weight) of from 1.0 to 2.5; and a water-based ink for inkjet recording containing the aqueous dispersion. The aqueous dispersion is capable of realizing a water-based ink for inkjet recording, which has excellent storage stability, a high optical density, and gives a high gloss.

18 Claims, No Drawings

# AQUEOUS DISPERSION FOR INKJET RECORDING

FIELD OF THE INVENTION

The present invention relates to an aqueous dispersion for inkjet recording. More specifically, the present invention relates to an aqueous dispersion for inkjet recording, which can be suitably used for, for instance, a water-based ink for inkjet recording.

BACKGROUND OF THE INVENTION

Inkjet recording is a recording system for forming characters or images, comprising directly jetting ink droplets from a very fine nozzle to a recording medium, and depositing the ink droplets on the recording medium. This system has some advantages such that not only the usable device shows excellent operability at a low level of noise, but also the coloration is facilitated and a plain sheet of paper can be used as a recording medium. Therefore, in recent years, this system has been widely used. Also, in recent years, pigment inks have been used as an ink for inkjet printers in order to improve water resistance and light fastness.

Since water-based inks in which a pigment is used as a colorant contain an aqueous dispersion containing the pigment and a water-insoluble polymer, it is important to improve storage stability.

As a means of improving storage stability, it is considered to be effective to increase adsorption capacity of a water-insoluble polymer for a pigment, and to incorporate the pigment sufficiently into the water-insoluble polymer. For this purpose, a macromer, a monomer having a long-chained alkyl group or the like has been used as a constitutive component of the polymer (see, e.g., Japanese Patent Laid-Open No. 2002-338783).

The macromer includes a styrene homopolymerized macromer and a copolymerized macromer of styrene and other monomer, having a polymerizable functional group at one end, a silicone macromer, and the like (see, e.g., Japanese Patent Laid-Open No. 2002-338783, WO 00/39226 and Japanese Patent Laid-Open No. 2001-123097).

However, with an increase in the copolymerizing content of especially the macromer of the water-insoluble polymer, there are some disadvantages such as an increase in viscosity of the aqueous dispersion containing a pigment, and storage stability of the water-based ink.

SUMMARY OF THE INVENTION

The present invention relates to an aqueous dispersion for inkjet recording containing colorant-containing water-insoluble vinyl polymer particles dispersed in water, wherein the water-insoluble vinyl polymer contains a constitutive unit derived from a styrenic macromer (a) which has a polymerizable functional group at one end, wherein the styrenic macromer (a) has a number-average molecular weight of from 1000 to 5000 and a molecular weight distribution (weight-average molecular weight/number-average molecular weight) of from 1.0 to 2.5; and a water-based ink containing the aqueous dispersion.

DETAILED DESCRIPTION OF THE INVENTION

The present invention relates to an aqueous dispersion for inkjet recording, which is, for instance, capable of realizing a water-based ink for inkjet recording, which has excellent storage stability, a high optical density, and gives a high gloss; and a water-based ink for inkjet recording containing the aqueous dispersion.

These and other advantages of the present invention will be apparent from the following description.

By using the aqueous dispersion for inkjet recording of the present invention, an excellent water-based ink for inkjet recording, which has excellent storage stability, has a high optical density, and is capable of giving excellent gloss can be provided.

One of the significant features of the aqueous dispersion for inkjet recording (hereinafter referred to as "aqueous dispersion") of the present invention resides in that the colorant-containing water-insoluble vinyl polymer contains a constitutive unit derived from a styrenic macromer (a) which has a polymerizable functional group at one end, wherein the styrenic macromer (a) has a number-average molecular weight of from 1000 to 5000 and a molecular weight distribution (weight-average molecular weight/number-average molecular weight) of from 1.0 to 2.5, wherein the particles of the water-insoluble vinyl polymer are dispersed in water. Here, the particle form of the colorant-containing water-insoluble vinyl polymer particles is not particularly limited. The particle form includes, for instance, a particle form in which the colorant is incorporated in the water-insoluble vinyl polymer, a particle form in which the colorant is homogenously dispersed in the water-insoluble vinyl polymer, a particle form in which the colorant is partially incorporated into the water-insoluble vinyl polymer and partially exposed to the particle surface, and the like.

The term "water-insoluble vinyl polymer" as used herein is not particularly limited as long as it is a given vinyl polymer having the same level of water insolubility as a water-insoluble polymer widely used in the filed of art. The degree of water insolubility of the polymer is preferably 10 g or less, more preferably 5 g or less, even more preferably 1 g or less, as expressed in terms of the amount of the polymer dissolved in 100 g of water at 25° C.

Conventionally, from the viewpoint of enhancing storage stability of a water-based ink containing an aqueous dispersion of colorant-containing water-insoluble vinyl polymer particles, the copolymerizing content of the macromer in the polymer particles has been increased. In addition, an increase in the copolymerizing content of the macromer results in an increase in hydrophobicity of the polymer particles, so that fixing ability of the water-based ink to the recording material is improved, thereby increasing optical density. However, an increase in the copolymerizing content of the macromer leads to an increase in viscosity of the aqueous dispersion and, and further to an increase in viscosity of the water-based ink, so that the jetting property of the water-based ink is lowered, causing a disadvantage such as blurriness in the printouts.

On the other hand, the water-insoluble vinyl polymer used in the present invention (hereinafter referred to as "polymer used in the present invention") contains a constitutive unit derived from a specified styrenic macromer having a relatively low molecular weight as compared to those of the conventional macromers, i.e. a number-average molecular weight of from 1000 to 5000 and a molecular weight distribution (weight-average molecular weight/number-average molecular weight) of from 1.0 to 2.5. The present inventors have unexpectedly found that only the copolymerizing content of the macromer can be increased without increasing viscosity of the aqueous dispersion by using the above-mentioned specified macromer for the polymer. Also, since an increase in the copolymerizing content of the macromer results in an increase in the number of hydrophobic units in the polymer, hydrophobicity of the polymer is increased. Therefore, the water-based ink prepared by using the aqueous dispersion of the present invention has excellent storage stability and gives printouts with a high optical density. Further, it is considered that since a styrenic macromer having a relatively low molecular weight is contained as a constitutive unit, the rate of aggregation on sheet is controlled, and the leveling property is improved, whereby the aqueous dispersion can give an unexpectedly high gloss.

The styrenic macromer (a) which has a polymerizable functional group at one end used in the polymer for the present invention includes, for instance, a styrene homopolymer having a polymerizable functional group at one end, and a copolymer of styrene and other monomer, having a polymerizable functional group at one end.

In the copolymer of styrene and other monomer, having a polymerizable functional group at one end, the other monomer includes, for instance, (1) acrylonitrile, (2) (meth) acrylates of which ester moiety has an alkyl group having 1 to 30 carbon atoms, preferably 1 to 18 carbon atoms, which may have a hydroxyl group, concretely methyl (meth)acrylate, ethyl (meth)acrylate, (iso)propyl (meth)acrylate, 2-hydroxyethyl (meth)acrylate, 3-hydroxypropyl (meth) acrylate, 4-hydroxybutyl (meth)acrylate, (iso or tertiary) butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate, and the like. Also, (3) an aromatic ring-containing monomer other than styrene includes, for instance, vinyl monomers having an aryl group which have 6 to 30 carbon atoms, preferably 6 to 22 carbon atoms, such as α-methylstyrene, vinylnaphthalene, vinyltoluene, ethylvinylbenzene, 4-vinylbiphenyl, 1,1-diphenylethylene, benzyl (meth)acrylate, phenoxyethyl (meth)acrylate, 2-hydroxy-3-phenoxypropyl acrylate, 2-methacryloyloxyethyl-2-hydrpoxypropyl phthalate, 2-acryloyloxyethyl phthalate, and the like.

These compounds can be used alone or in admixture of two or more kinds.

Incidentally, the "(iso or tertiary)" and "(iso)," as referred to herein include both the case where a branched structure referred to as "iso" or "tertiary" is present and the case where such structure is absent (normal). Also, "(meth) acryl-" as referred to herein means "acryl-" or "methacryl-." Also, the content of styrene is preferably 60% by weight or more, more preferably 70% by weight or more, of the styrenic macromer, from the viewpoint of sufficiently incorporating the pigment into the polymer particles.

Among the styrenic macromers which have a polymerizable functional group at one end, those styrenic macromers having an acryloyloxy group or a methacryloyloxy group as a polymerizable functional group at one end are preferable.

From the viewpoint of controlling the viscosity at a low level, while increasing the copolymerization ratio in order to enhance the storage stability, the styrenic macromer of the present invention has a number-average molecular weight of from 1000 to 5000, preferably from 1000 to 4000, more preferably from 2000 to 4000. When the number-average molecular weight is less than 1000, there is little effect of improving storage stability. When the number-average molecular weight exceeds 5000, it is difficult to control the viscosity of the aqueous dispersion at a low level, while increasing the copolymerization ratio.

On the other hand, from the viewpoint of preparing a polymer having uniform and well-balanced hydrophilicity and hydrophobicity, the molecular weight distribution, i.e. weight-average molecular weight/number-average molecular weight, is from 1.0 to 2.5, preferably from 1.1 to 2.5, more preferably from 1.1 to 2.0. The molecular weight distribution is preferably 1.1 or more from the industrial viewpoint. When the molecular weight distribution exceeds 2.5, the number-average molecular weight varies, indicating that the polymer chains having different polarities are present, so that it is considered that storage stability of the aqueous dispersion is impaired. The molecular weight distribution is obtained by dividing the weight-average molecular weight of the polymer by its number-average molecular weight.

The number-average molecular weight, the weight-average molecular weight and the molecular weight distribution of the styrenic monomer are values determined by gel permeation chromatography using polystyrene as a standard substance and tetrahydrofuran containing 50 mmol/L acetic acid as a solvent.

The process for preparing the styrenic macromer used in the present invention includes, for instance, the methods described in Japanese Examined Patent Publication Nos. Sho 43-11224 and Sho 43-16147, and Japanese Patent Laid-Open No. Sho 62-212403.

The polymer used in the present invention is obtained by polymerizing a monomer composition containing at least the above-mentioned styrenic macromer (a). The content of the styrenic macromer (a) in the monomer composition or the copolymerizing content of the styrenic macromer (a) in the polymer used in the present invention are preferably from 5 to 50% by weight, more preferably from 18 to 50% by weight, even more preferably from 20 to 50% by weight, even more preferably from 20 to 40% by weight, from the viewpoint of sufficiently incorporating the pigment into the polymer.

The content of the constitutive unit derived from the styrenic macromer (a) in the polymer used in the present invention may be herein referred to as copolymerizing content of the styrenic macromer. When the term copolymerizing content is used in context of other components, the meaning is likewise that for the styrenic monomer (a).

As a component contained in the above-mentioned monomer composition, other than the above-mentioned styrenic macromer (a), for instance, a salt-forming group-containing monomer (b), a polyoxyalkylene group-containing monomer (c), and optionally a monomer (d) copolymerizable with the components (a), (b) and (c) are suitably used. Therefore, the polymer used in the present invention is preferably prepared by polymerizing a monomer composition containing at least components (a), (b) and (c) from the viewpoint of exhibiting the desired effects of the present invention.

The salt-forming group-containing monomer (b) includes, for example, cationic monomers, anionic monomers, and the like. Examples of the salt-forming group-containing monomer (b) include those described in page 5, column 7, line 24 to column 8, line 29 of Japanese Patent Laid-Open No. Hei 9-286939, and the like.

Representative examples of the cationic monomers include tertiary amine-containing unsaturated monomers, ammonium salt-containing unsaturated monomers, and the like. Among the cationic monomers, N-(N',N'-dimethylaminopropyl) (meth)acrylamide is preferable.

Representative examples of the anionic monomers include unsaturated carboxylic acid monomers, unsaturated sulfonic acid monomers, unsaturated phosphoric acid monomers, and the like. Among the anionic monomers, unsaturated carboxylic acid monomers such as methacrylic acid are preferable.

The content of the salt-forming group-containing monomer (b) in the monomer composition used for preparation of the polymer used in the present invention, and the copolymerizing content of the salt-forming group-containing monomer (b) in the polymer used in the present invention, is preferably from 1 to 50% by weight, more preferably from 2 to 40% by weight, even more preferably from 5 to 20% by weight, from the viewpoint of enhancing storage stability of the aqueous dispersion of the polymer particles.

Representative examples of the polyoxyalkylene group-containing monomer (c) include a monomer represented by the formula (I):

$$CH_2=C(R^1)COO(R^4O)_rR^5 \qquad (I)$$

wherein $R^1$ is a hydrogen atom or a lower alkyl group; $R^4$ is a divalent hydrocarbon group having 1 to 30 carbon atoms, which may have a hetero-atom; $R^5$ is a hydrogen atom or a monovalent hydrocarbon group having 1 to 30 carbon atoms, which may have a hetero-atom; and r is an average number of moles of $R^4O$, which is an integer of from 1 to 60. The monomer exhibits an excellent effect of improving jetting stability of the water-based ink.

In the formula (I), $R^1$ is a hydrogen atom or a lower alkyl group. The lower alkyl group includes an alkyl group having 1 to 4 carbon atoms.

$R^4$ is a divalent hydrocarbon group having 1 to 30 carbon atoms, which may have a hetero-atom. The hetero-atom includes, for example, a nitrogen atom, an oxygen atom, a halogen atom, such as a fluorine atom, a chlorine atom and a bromine atom, and a sulfur atom. Each of $R^4$ may be same or different.

Representative examples of $R^4$ include a divalent aromatic ring having 6 to 30 carbon atoms, which may have a substituent; a divalent heterocyclic ring having 3 to 30 carbon atoms, which may have a substituent; and an alkylene group having 1 to 30 carbon atoms, which may have a substituent.

The substituents for $R^4$ include an aromatic ring having 6 to 29 carbon atoms, a heterocyclic ring having 3 to 29 carbon atoms, and an alkyl group having 1 to 29 carbon atoms, a halogen atom, such as a fluorine atom, a chlorine atom and a bromine atom, an amino group, and the like.

Preferred examples of $R^4$ include a phenylene group which may have a substituent having 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

In addition, preferred examples of $R^4O$ include alkylene oxide groups having 2 to 7 carbon atoms such as an ethylene oxide group, an (iso)propylene oxide group, a tetramethylene oxide group, a heptamethylene oxide group, a hexamethylene oxide group, and combinations of two or more kinds of these alkylene oxides; and phenylene oxide groups.

$R^5$ is a hydrogen atom or a monovalent hydrocarbon group having 1 to 30 carbon atoms, which may have a hetero-atom. The hetero-atom includes, for instance, a nitrogen atom, an oxygen atom and a sulfur atom.

Representative examples of $R^5$ include a hydrogen atom; an aromatic ring having 6 to 30 carbon atoms, which may have a substituent; a heterocyclic ring having 3 to 30 carbon atoms, which may have a substituent; and an alkyl group having 1 to 30 carbon atoms, which may have a substituent. The substituent includes an aromatic ring having 6 to 29 carbon atoms; a heterocyclic ring having 4 to 29 carbon atoms; a halogen atom, such as a fluorine atom, a chlorine atom and a bromine atom; an amino group, and the like.

Preferred examples of $R^5$ include a hydrogen atom, a phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferred examples of $R^5$ include a hydrogen atom, an alkyl group having 1 to 6 carbon atoms, such as a methyl group, an ethyl group, an (iso)propyl group, an (iso)butyl group, an (iso)pentyl group and an (iso)hexyl group, a phenyl group, and the like.

r is an integer of from 1 to 60, preferably an integer of from 1 to 30, more preferably an integer of from 3 to 10.

Concrete examples of the monomer represented by the formula (I) include polyethylene glycol (2-30: r value in the formula (I), hereinafter referred to the same) (meth)acrylates, poly(ethylene glycol (1-15).propylene glycol (1-15)) (meth)acrylates, polypropylene glycol (2-30) (meth)acrylates, methoxypolyethylene glycol (1-30) (meth)acrylates, methoxypolytetramethylene glycol (1-30) (meth)acrylates, ethoxypolyethylene glycol (1-30) (meth)acrylates, (iso)propoxypolyethylene glycol (1-30) (meth)acrylates, butoxypolyethylene glycol (1-30) (meth)acrylates, methoxypolypropylene glycol (1-30) (meth)acrylates, methoxy (ethylene glycol.propylene glycol copolymer) (1-30, out of which ethylene glycol: 1-29) (meth)acrylates, and the like. These monomers can be used alone or in admixture of two or more kinds.

Among the monomers represented by the formula (I), polyethylene glycol (2-30) (meth)acrylates and polypropylene glycol (2-30) (meth)acrylates are preferable.

The content of the polyoxyalkylene group-containing monomer (c) in the monomer composition, and the copolymerizing content of the polyoxyalkylene group-containing monomer (c) in the polymer used in the present invention, is preferably from 5 to 50% by weight, more preferably from 10 to 40% by weight, from the viewpoint of enhancing jetting stability of the water-based ink.

The total content of the salt-forming group-containing monomer (b) and the polyoxyalkylene group-containing monomer (c) in the polymer used in the present invention is preferably from 6 to 75% by weight, more preferably from 10 to 60% by weight, even more preferably from 20 to 40% by weight, from the viewpoint of enhancing dispersion stability of the aqueous dispersion of the polymer particles and jetting stability of the water-based ink.

The monomer (d) copolymerizable with the above-mentioned monomers (a), (b) and (c) (hereinafter referred to as "copolymerizable monomer") includes (meth)acrylates such as methyl (meth)acrylate, ethyl (meth)acrylate, (iso)propyl (meth)acrylate, (iso or tertiary)butyl (meth)acrylate, (iso) amyl (meth)acrylate, cyclohexyl (meth)acrylate, 2-ethylhexyl (meth)acrylate, benzyl (meth)acrylate, 2-hydroxyethyl (meth)acrylate and 3-hydroxypropyl (meth)acrylate; styrenic monomers such as styrene, α-methylstyrene, vinyltoluene, 2-methylstyrene and chlorostyrene; and the like. These monomers can be used alone or in admixture of two or more kinds.

It is preferable that the copolymerizable monomer (d) contains a styrenic monomer from the viewpoint of increasing optical density of the water-based ink. Preferred styrenic monomer includes styrene, α-methylstyrene and the like. These styrenic monomers can be used alone or in admixture thereof.

The content of the copolymerizable monomer (d) in the monomer composition, and the copolymerizing content of the copolymerizable monomer (d) in the polymer used in the present invention, is preferably from 5 to 50% by weight, more preferably from 5 to 45% by weight, from the viewpoint of increasing optical density of the water-based ink.

The monomer composition may further contain other monomers. In addition, each of the above-mentioned raw material components can properly be used alone or in admixture of two or more kinds.

The polymer used in the present invention is obtained by polymerizing the monomer composition by a known polymerization method such as a bulk polymerization method, a solution polymerization method, a suspension polymerization method, or an emulsion polymerization method. Among these polymerization methods, the solution polymerization method is preferable.

As a solvent used in the solution polymerization method, an organic solvent is preferable. When a water-miscible organic solvent is used as the organic solvent, the water-miscible organic solvent can also be used in admixture with water.

The organic solvent includes, for instance, an aliphatic alcohol having 1 to 3 carbon atoms, such as methanol, ethanol and propanol; ketones such as acetone, methyl ethyl ketone and methyl isobutyl ketone; esters such as ethyl acetate; and the like. Among them, methanol, ethanol, acetone, methyl ethyl ketone, or a mixed solvent of one or more of them with water is preferable.

In the polymerization, a radical polymerization initiator can be used. Preferred radical polymerization initiator includes azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis (1-cyclohexanecarbonitrile). Also, as the radical polymerization initiator, an organic peroxide such as t-butyl peroxyoctoate, di-t-butyl peroxide or dibenzoyl oxide can be used.

The amount of the radical polymerization initiator to the monomer composition is preferably from 0.001 to 5 mol, more preferably from 0.01 to 2 mol, per 100 mol of the monomer composition.

In the polymerization, a polymerization chain transfer agent may be further added. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, dipentene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. These polymerization chain transfer agents can be used alone or in admixture of two or more kinds.

The polymerization conditions for the monomer composition differ depending upon kinds of the radical polymerization initiator, the monomers and the solvent used, and the like. It is preferable that the polymerization temperature is usually from 30° to 100° C., preferably from 50° to 80° C., and that the polymerization time period is usually from 1 to 20 hours. In addition, it is preferable that the polymerization atmosphere is an atmosphere of an inert gas such as nitrogen gas.

After the termination of the polymerization reaction, the polymer formed can be isolated from the reaction solution by a known method such as reprecipitation or solvent distillation. Also, the resulting polymer can be purified by the removal of unreacted monomers and the like by the repeat of reprecipitation, membrane separation, chromatography, extraction or the like.

The weight-average molecular weight of the polymer used in the present invention is preferably from 10000 to 200000, more preferably from 20000 to 200000, even more preferably from 20000 to 100000, from the viewpoints of improvement in jetting property of the water-based ink, prevention of scorching on a printer head, improvement in durability of the ink after printing, and improvement in storage stability of the aqueous dispersion. The weight-average molecular weight of the polymer is determined by the method described in Preparation Example 1 which is set forth below.

The colorant is preferably a pigment. The pigment can be any of inorganic pigments and organic pigments. In addition, the pigment can be used together with an extender as occasion demands.

The inorganic pigment includes, for instance, carbon blacks, metal oxides, metal sulfides, metal chlorides, and the like. Among them, especially in a water-based black ink, carbon black is preferable. The carbon black includes furnace black, thermal lamp black, acetylene black, channel black and the like.

The organic pigment includes, for instance, azo pigments, dis-azo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender includes silica, calcium carbonate, talc and the like.

The amount of the colorant used in the present invention is preferably from 20 to 400 parts by weight, more preferably from 50 to 300 parts by weight, based on 100 parts by weight of the resin solid content of the polymer, from the viewpoints of improvement in optical density of the water-based ink and facilitation of the incorporation of the colorant into the polymer particles.

The aqueous dispersion of the present invention can be prepared, for instance, by dissolving the polymer in an organic solvent, adding a pigment to the resulting solution, pre-kneading the mixture and then adding a neutralizing agent and water thereto, kneading the mixture obtained and then subjecting the kneaded mixture to a dispersion treatment to give an oil-in-water dispersion, and removing the organic solvent and the volatile neutralizing agent from the resulting kneaded mixture.

When kneading and dispersion treatment are carried out, for instance, a ball mill, a roll-mill, a beads-mill, a high-pressure homogenizer, a high-speed agitation disperser, or the like can be used. Among them, a high-pressure homogenizer is preferable from the viewpoint of reducing the amount of inorganic impurities.

The "organic solvent" used for dissolving the polymer in the preparation of the aqueous dispersion of the present invention refers to an organic solvent having a boiling point of less than 130° C. at 101 kPa. Among the organic solvents, alcohol-based solvents, ketone-based solvents and ether-based solvents are preferable.

The alcohol-based solvent includes methanol, ethanol, isopropanol, n-butanol, tert-butanol, isobutanol, diacetone alcohol, and the like. The ketone-based solvent includes acetone, methyl ethyl ketone, diethyl ketone, methyl isobutyl ketone, and the like. The ether-based solvent includes dibutyl ether, tetrahydrofuran, dioxane, and the like. Among those solvents, isopropanol, acetone and methyl ethyl ketone are preferable. Also, the above-mentioned organic solvent and a hydrophilic organic solvent having a high boiling point can be used together as occasion demands.

The above-mentioned "hydrophilic organic solvent having a high boiling point" refers to those having a boiling point of 130° C. or higher at 101 kPa. Examples thereof include phenoxyethanol, ethylene glycol monomethyl ether, diethylene glycol monomethyl ether, diethylene glycol monoethyl ether, diethylene glycol diethyl ether, and the like.

As the neutralizing agent, an acid or a base can be used depending upon the kind of the salt-forming group in the polymer. The neutralizing agent includes volatile neutralizing agents and non-volatile neutralizing agents. The volatile neutralizing agent includes acids such as hydrochloric acid, acetic acid and propionic acid; and bases such as ammonia, methylamine, dimethylamine, trimethylamine, ethylamine, diethylamine and triethylamine.

The non-volatile neutralizing agent includes acids such as phosphoric acid, sulfuric acid, lactic acid, succinic acid, glycollic acid, gluconic acid and glyceric acid; and bases such as sodium hydroxide and potassium hydroxide.

The molar ratio of the volatile neutralizing agent to the non-volatile neutralizing agent (volatile neutralizing agent: non-volatile neutralizing agent) is preferably from 1:99 to 50:50, more preferably from 10:90 to 40:60, from the viewpoint of improvement in dispersibility of the colorant and storage stability of the aqueous dispersion.

The solubility of the polymer used in the present invention in water at 25° C. after neutralizing the salt-forming group of the polymer at 100% with sodium hydroxide or acetic acid, depending on the salt-forming group, is preferably 10% by weight or less, more preferably 5% by weight or less, even more preferably 1% by weight or less, from the viewpoint of lowering viscosity of the water-based ink.

The average particle diameter of the colorant-containing polymer particles is preferably from 0.01 to 0.50 μm, more preferably from 0.02 to 0.20 μm, from the viewpoints of prevention of clogging of nozzles of a printer and improvement in dispersion stability of the polymer particles. The average particle diameter is determined using, for instance, a laser particle analyzer system ELS-8000 commercially available from Otsuka Denshi K. K.

The content (solid content) of the colorant-containing polymer particles in the aqueous dispersion of the present invention is preferably from 1 to 50% by weight, more preferably from 5 to 30% by weight, from the viewpoint of improvement in optical density of the printouts and storage stability of the aqueous dispersion. The content of water in the aqueous dispersion is preferably from 40 to 90% by weight. Here, water is not particularly limited, and any water such as distilled water or ion-exchanged water is used.

The water-based ink for inkjet recording of the present invention (hereinafter simply referred to as "water-based ink") may contain only the aqueous dispersion of the present invention. However, the water-based ink can further contain water, and an additive such as a wetting agent, a dispersant, a defoaming agent, a mildew proof agent or a chelating agent by adding and mixing them with the aqueous dispersion, as desired.

It is desirable that the amount of the aqueous dispersion in the water-based ink is usually adjusted so that the content (solid content) of the colorant-containing polymer particles in the water-based ink is preferably from 1 to 30% by weight, more preferably from 2 to 15% by weight, from the viewpoint of securing excellent optical density and jetting stability.

Preferred ranges of the content of water in the water-based ink is the same as those in the above-mentioned aqueous dispersion.

The wetting agent includes, for instance, polyhydric alcohols and ethers thereof, such as ethylene glycol, propylene glycol, diethylene glycol, triethylene glycol, polyethylene glycol, glycerol, diethylene glycol diethyl ether and diethylene glycol mono-n-butyl ether; acetates; nitrogen-containing compounds such as N-methyl-2-pyrrolidone and 1,3-dimethylimidazolidinone; and the like. The amount of the wetting agent in the water-based ink is preferably from 0.1 to 50% by weight, more preferably from 0.1 to 30% by weight.

As the dispersant, anionic, nonionic, cationic and amphoteric dispersants, such as surfactants, can be used. The content of the dispersant in the water-based ink is preferably from 0.1 to 50% by weight, more preferably from 1 to 20% by weight.

The defoaming agent includes a compound represented by the formula (II):

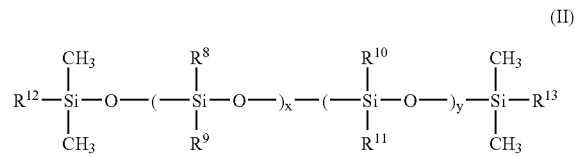

wherein each of $R^8$, $R^9$, $R^{10}$ and $R^{11}$ is independently an alkyl group having 1 to 10 carbon atoms, or a phenyl group which may have a substituent; each of $R^{12}$ and $R^{13}$ is independently an alkyl group having 1 to 10 carbon atoms, a phenyl group which may have a substituent, a hydroxyl group, an amino group, a carboxyl group or an epoxy group; each of x and y is independently an integer of from 0 to 1000, preferably from 10 to 100. This compound is preferable from the viewpoints of suppression of the generation of foams in the preparation of the water-based ink and adjustment of the surface tension of the water-based ink.

The content of the defoaming agent in the water-based ink is preferably from 0.001 to 2.0% by weight, more preferably from 0.005 to 0.5% by weight, from the viewpoints of suppression of the generation of foams and improvement in jetting stability of the water-based ink.

In addition, any of the known ones can be used for the mildewproof agent, the chelating agent and the like in the water-based ink.

Thus, the water-based ink of the present invention is obtained. The water-based ink of the present invention is highly excellent in the jetting stability and the storage stability because the water-based ink has the constitution as mentioned above.

EXAMPLES

The following examples further describe and demonstrate embodiments of the present invention. The examples are given solely for the purpose of illustration and are not to be construed as limitations of the present invention.

Preparation Example 1

(1) Preparation of Styrenic Macromer which has a Polymerizable Functional Group at One End A macromer containing a styrene homopolymer was prepared according to the following method.

[Process for Preparing Polystyrene]

A reaction vessel was charged with 25 parts by weight of toluene, 50 parts by weight of styrene and 1 part by weight of mercaptopropionic acid, and the contents were mixed. Replacement with nitrogen gas was sufficiently carried out, to give a mixed solution.

On the other hand, a dropping funnel 1 was charged with 60 parts by weight of toluene, 200 parts by weight of styrene, 4 parts by weight of mercaptopropionic acid, and a solution prepared by dissolving 2 parts by weight of 4,4-azobis(4-cyanovaleric acid) in 40 parts by weight of ethanol, and the contents were mixed. Replacement with nitrogen gas was sufficiently carried out, to give a mixed solution.

Further, a dropping funnel 2 was charged with 20 parts by weight of toluene, 1.2 parts by weight of mercaptopropionic acid, and a solution prepared by dissolving 1 part by weight of 4,4-azobis(4-cyanovaleric acid) in 40 parts by weight of ethanol, and the contents were mixed. Replacement with nitrogen gas was sufficiently carried out, to give a mixed solution.

The mixed solution in the reaction vessel was heated to 90° C. under nitrogen gas atmosphere while stirring, and the mixed solution in the dropping funnel 1 was gradually added thereto dropwise over a period of 4 hours. After the termination of the dropwise addition, the mixed solution in the dropping funnel 2 was gradually added thereto dropwise over a period of 4 hours. Further, the mixture was aged at 95° C. for 1 hour, to give a polystyrene solution.

A part of the resulting polymer solution was dried at 105° C. under a reduced pressure for 2 hours to remove the solvent, so that the polymer was isolated. The molecular weight of the polymer was determined by gel permeation chromatography using polystyrene as a standard substance and tetrahydrofuran containing 50 mmol/L acetic acid as a solvent. As a result, the weight-average molecular weight Mw was 7800, and the number-average molecular weight Mn was 3060.

[Reaction for Introduction of Double Bond]

A reaction vessel equipped with an air inlet tube was charged with 390 parts by weight of the above polystyrene solution, 10 parts by weight of glycidyl methacrylate, 9 parts by weight of toluene, 4.5 parts by weight of tetrabutylammonium bromide, and 0.45 parts by weight of methoquinone, and the contents were mixed. The reaction mixture was heated to 90° C. while stirring and introducing the air into the reaction vessel via the air inlet tube, and reacted for 10 hours.

A part of the resulting macromer solution was taken, the acid value was determined, and the introduction ratio of double bonds was obtained. As a result, the introduction ratio of double bonds was 92.5%. Also, a part of the resulting macromer solution was dried at 105° C. under a reduced pressure for 2 hours to remove the solvent, so that the polymer was isolated. The molecular weight of the polymer was determined by gel permeation chromatography using polystyrene as a standard substance and tetrahydrofuran containing 50 mmol/L acetic acid as a solvent. As a result, the weight-average molecular weight Mw was 7700, the number-average molecular weight Mn was 3200, and the molecular weight distribution was 2.42.

The resulting macromer solution was dried under a reduced pressure, to give a styrenic macromer A (polymerizable functional group: methacryloyloxy group), which was used in the subsequent process.

(2) Preparation of Water-Insoluble Vinyl Polymer

A reaction vessel was charged with 10 parts by weight of methyl ethyl ketone, the monomers listed in the column of "Initially Charged Monomers" for Preparation Example 1 in Table 1, and a polymerization chain transfer agent (2-mercaptoethanol). The contents were mixed, and replacement with nitrogen gas was sufficiently carried out, to give a mixed solution. Incidentally, the styrenic macromer is also listed as "Monomer" in Table 1.

On the other hand, a dropping funnel was charged with the monomers listed in the column of "Dropping Monomers" for Preparation Example 1 in Table 1 and the polymerization chain transfer agent, and 70 parts by weight of methyl ethyl ketone and 2.7 parts by weight of 2,2'-azobis(2,4-dimethylvaleronitrile) were added thereto. The contents were mixed, and replacement with nitrogen gas was sufficiently carried out, to give a mixed solution.

The mixed solution in the reaction vessel was heated to 70° C. under nitrogen gas atmosphere while stirring, and the mixed solution in the dropping funnel was gradually added thereto dropwise over a period of 3 hours. After 30 minutes from the termination of the dropwise addition at 75° C., a solution prepared by dissolving 3.6 parts by weight of 2,2'-azobis(2,4-dimethylvaleronitrile) in 110 parts by weight of methyl ethyl ketone was gradually added thereto dropwise over a period of 3 hours. Further, the mixture was aged at 80° C. for 1 hour, to give a polymer solution.

A part of the resulting polymer solution was dried at 105° C. under a reduced pressure for 2 hours to remove the solvent, so that the polymer was isolated. The weight-average molecular weight of the polymer was determined by gel permeation chromatography using polystyrene as a standard substance and dimethylformamide containing 60 mmol/L phosphoric acid and 50 mmol/L lithium bromide as a solvent. The results are also shown in Table 1.

Preparation Example 2

(1) Preparation of Styrenic Macromer which has a Polymerizable Functional Group at One End

[Process for Preparing Polystyrene]

A reaction vessel was charged with 10 parts by weight of toluene, 50 parts by weight of styrene and 1 part by weight of mercaptopropionic acid, and the contents were mixed. Replacement with nitrogen gas was sufficiently carried out, to give a mixed solution.

On the other hand, a dropping funnel 1 was charged with 60 parts by weight of toluene, 200 parts by weight of styrene, 4.2 parts by weight of mercaptopropionic acid, and a solution prepared by dissolving 4 parts by weight of 4,4-azobis(4-cyanovaleric acid) in 40 parts by weight of ethanol, and the contents were mixed. Replacement with nitrogen gas was sufficiently carried out, to give a mixed solution.

Further, a dropping funnel 2 was charged with 80 parts by weight of toluene, 2.3 parts by weight of mercaptopropionic acid, and a solution prepared by dissolving 6 parts by weight of 4,4-azobis(4-cyanovaleric acid) in 60 parts by weight of ethanol, and the contents were mixed. Replacement with nitrogen gas was sufficiently carried out, to give a mixed solution.

The mixed solution in the reaction vessel was heated to 90° C. under nitrogen gas atmosphere while stirring, and the mixed solution in the dropping funnel 1 was gradually added thereto dropwise over a period of 4 hours. After the termination of the dropwise addition, the mixed solution in the dropping funnel 2 was gradually added thereto dropwise over a period of 4 hours. Further, the mixture was aged at 95° C. for 1 hour, to give a polystyrene solution.

A part of the resulting polymer solution was dried at 105° C. under a reduced pressure for 2 hours to remove the solvent, so that the polymer was isolated. The molecular weight of the polymer was determined by gel permeation chromatography using polystyrene as a standard substance and tetrahydrofuran containing 50 mmol/L acetic acid as a solvent. As a result, the weight-average molecular weight Mw was 5890, and the number-average molecular weight Mn was 3180.

[Reaction for Introduction of Double Bond]

A reaction vessel equipped with an air inlet tube was charged with 480 parts by weight of the above polystyrene solution, 20 parts by weight of glycidyl methacrylate, 9 parts by weight of toluene, 4.6 parts by weight of tetrabutylammonium bromide, and 0.47 parts by weight of methoquinone, and the contents were mixed. The reaction mixture was heated to 90° C. while stirring and introducing the air into the reaction vessel via the air inlet tube, and reacted for 12 hours.

A part of the resulting macromer solution was taken, the acid value was determined and the introduction ratio of double bonds was obtained. As a result, the introduction ratio of double bonds was 93.0%. Also, a part of the resulting macromer solution was dried at 105° C. under a reduced pressure for 2 hours to remove the solvent, so that the macromer was isolated. The molecular weight of the macromer was determined by gel permeation chromatography using polystyrene as a standard substance and tetrahydrofuran containing 50 mmol/L acetic acid as a solvent. As a result, the weight-average molecular weight Mw was 5920, the number-average molecular weight Mn was 3190, and the molecular weight distribution was 1.86.

The resulting macromer solution was dried under a reduced pressure, to give a styrenic macromer B (polymerizable functional group: methacryloyloxy group), which was used in the subsequent process.

(2) Preparation of Water-Insoluble Vinyl Polymer

A reaction vessel was charged with 10 parts by weight of methyl ethyl ketone, the monomers listed in the column of "Initially Charged Monomers" for Preparation Example 2 in Table 1, and the polymerization chain transfer agent. The contents were mixed, and replacement with nitrogen gas was sufficiently carried out, to give a mixed solution.

On the other hand, a dropping funnel was charged with the monomers listed in the column of "Dropping Monomers" for Preparation Example 2 in Table 1 and the polymerization chain transfer agent, and 70 parts by weight of methyl ethyl ketone and 2.7 parts by weight of 2,2'-azobis(2,4-dimethylvaleronitrile) were added thereto. The contents were mixed, and replacement with nitrogen gas was sufficiently carried out, to give a mixed solution.

The mixed solution in the reaction vessel was heated to 70° C. under nitrogen gas atmosphere while stirring, and the mixed solution in the dropping funnel was gradually added thereto dropwise over a period of 3 hours. After 30 minutes from the termination of the dropwise addition at 75° C. a solution prepared by dissolving 3.6 parts by weight of 2,2'-azobis(2,4-dimethylvaleronitrile) in 110 parts by weight of methyl ethyl ketone was gradually added thereto dropwise over a period of 3 hours. Further, the mixture was aged at 80° C. for 1 hour, to give a polymer solution.

A part of the resulting polymer solution was dried at 105° C. under a reduced pressure for 2 hours to remove the solvent, so that the polymer was isolated. The weight-average molecular weight of the polymer was determined by gel permeation chromatography using polystyrene as a standard substance and dimethylformamide containing 60 mmol/L phosphoric acid and 50 mmol/L lithium bromide as a solvent. The results are also shown in Table 1.

Comparative Preparation Example 1

A polymer solution was prepared according to the process described in "(2) Preparation of Water-Insoluble Vinyl Polymer" of Preparation Example 1 according to the formulation shown in the columns of "Initially Charged Monomers" and "Dropping Monomers" for Comparative Preparation Example 1 in Table 1. Incidentally, a styrenic macromer C, as described in Table 1 below, was used as the styrenic macromer. The styrenic macromer C had a weight-average molecular weight of 13700, a number-average molecular weight of 5100, and a molecular weight distribution of 2.7.

TABLE 1

| Prep. Ex. No. | Initially Charged Monomers (parts by weight) | | Dropping Monomers (parts by weight) | | Copolymerizing Content of Styrenic Macromer (% by weight) | Weight-Average Molecular Weight |
|---|---|---|---|---|---|---|
| 1 | Styrene | 24.6 | Styrene | 98.4 | 20 | 72000 |
|   | Methacrylic Acid | 8.4 | Methacrylic Acid | 33.6 | | |
|   | Octylpolyethylene Glycol Polypropylene Glycol Methacrylate | 15 | Octylpolyethylene Glycol Polypropylene Glycol Methacrylate | 60 | | |
|   | Styrenic Macromer A | 12 | Styrenic Macromer A | 48 | | |
|   | 2-Mercaptoethanol | 0.24 | 2-Mercaptoethanol | 0.96 | | |
| 2 | Styrene | 21.6 | Styrene | 86.4 | 25 | 63000 |
|   | Methacrylic Acid | 8.4 | Methacrylic Acid | 33.6 | | |
|   | Octylpolyethylene Glycol Polypropylene Glycol Methacrylate | 15 | Octylpolyethylene Glycol Polypropylene Glycol Methacrylate | 60 | | |

TABLE 1-continued

| Prep. Ex. No. | Initially Charged Monomers (parts by weight) | | Dropping Monomers (parts by weight) | | Copolymerizing Content of Styrenic Macromer (% by weight) | Weight-Average Molecular Weight |
|---|---|---|---|---|---|---|
| Comp. Prep. Ex. 1 | Styrenic Macromer B | 9 | Styrenic Macromer B | 60 | 15 | 56000 |
| | 2-Mercaptoethanol | 0.27 | 2-Mercaptoethanol | 1.08 | | |
| | Styrene | 28.8 | Styrene | 115 | | |
| | Acrylic Acid | 7.2 | Acrylic Acid | 28.8 | | |
| | Polyoxypropylene Monomethacrylate | 15 | Polyoxypropylene Monomethacrylate | 60 | | |
| | Styrenic Macromer C | 9 | Styrenic Macromer C | 36 | | |
| | 2-Mercaptoethanol | 0.36 | 2-Mercaptoethanol | 1.44 | | |

Octylpolyethylene Glycol Polypropylene Glycol Methacrylate (number of moles of ethylene oxide added: 8, number of moles of propylene oxide added: 6, terminal: 2-ethylhexyl group): commercially available from NOF Corporation, trade name: BLEMMER 50POEP-800B
Polyoxypropylene Monomethacrylate (number of moles of propylene oxide added: 9, terminal: a hydrogen atom): commercially available from NOF Corporation, trade name: BLEMMER PP-500
Styrenic Macromer C: (polymerizable functional group: methacryloyloxy group): commercially available from TOAGOSEI CO., LTD., trade name: AS-6S (Styrenic Macromer)

Examples 1 and 2 and Comparative Example 1

Each of the polymer solutions obtained in Preparation Examples 1 and 2 and Comparative Preparation Example 1 was dried under a reduced pressure, to give each polymer. Eight parts by weight of the polymer obtained was dissolved in 28 parts by weight of methyl ethyl ketone. Neutralizing agents (5N aqueous sodium hydroxide and 25% aqueous ammonia) in given amounts shown in Table 2 were added thereto to neutralize the salt-forming group. Further, 32 parts by weight of a quinacridone pigment [C. I. Pigment Red 122, commercially available from DAINICHISEIKA COLOR & CHEMICALS MFG. CO., LTD.] was added thereto, and the resulting mixture was kneaded with a triple roller for 1 hour.

Two-hundred and seventy parts by weight of ion-exchanged water were added to the resulting kneaded mixture while stirring. Thereafter, methyl ethyl ketone and ammonia were removed at 60° C. under a reduced pressure, and a part of water was further removed, to give an aqueous dispersion of pigment-containing water-insoluble polymer, the solid content of which was 20% by weight.

Twenty-eight parts by weight (solid content: 5.6 parts by weight) of the resulting aqueous dispersion of pigment-containing water-insoluble polymer, 16 parts by weight of diethylene glycol, 1.6 parts by weight of Surfinol 465 (commercially available from Air Products) and 34.4 parts by weight of ion-exchanged water were mixed together. The resulting liquid mixture was filtered with a 25-mL needleless syringe [commercially available from TERUMO CORPORATION] equipped with a 0.5 μm filter [acetyl cellulose membrane, outer diameter: 2.5 cm, commercially available from Fuji Photo Film Co., Ltd.], thereby removing coarse grains, to give a water-based ink.

Next, the physical properties of each of the water-based inks obtained were evaluated in accordance with the following methods. The results are shown Table 2.

(1) Average Particle Diameter

Average particle diameter of the colorant-containing polymer particles which were contained in an ink was determined with a laser particle analyzer system ELS-8000, commercially available from Otsuka Denshi K. K.

(2) Storage Stability

Viscosity (hereinafter referred to as the viscosity before storage) of an ink was determined at 20° C. at 100 r/min using RE80L VISCOMETER (Rotor 1) commercially available from Toki Sangyo K. K. Also, the ink was stored for 1 week in a thermostat kept at 70° C., and thereafter the viscosity of an ink (hereinafter referred to as the viscosity after storage) was determined in the same manner as above.

As an index for storage stability, the degree of storage stability was obtained by the following equation:

$$[\text{Degree of Storage Stability}] = ([\text{Viscosity After Storage}]/[\text{Viscosity Before Storage}]) \times 100$$

The smaller the value, the more excellent the storage stability.

(3) Optical Density

Solid image printing was carried out on a 4024 paper commercially available from Xerox, using a commercially available Bubble Jet (registered trade mark) printer (model number: HP5551) from HEWLETT PACKARD, in high-quality image mode. The printed image was allowed to stand at 25° C. for 1 hour, and thereafter its optical density was determined by using a Macbeth densitometer (commercially available from Macbeth Process Measurements Co., product number: RD914). The higher the value, the higher the optical density, and the desired value is 1.25 or more.

(4) Gloss

Solid image printing was carried out on a commercially available MC gloss paper from EPSON CORPORATION, using the above-mentioned printer. The printed image was allowed to stand at 25° C. for 1 hour, and thereafter its gloss was determined by using a glossmeter (commercially available from Nippon Denshoku Kogyo K. K., trade name: HANDY GLOSSMETER, product number: PG-1). The desired value is 40 or more.

TABLE 2

|  | 5N | | Results of Evaluation | | | | | |
|---|---|---|---|---|---|---|---|---|
|  | Aqueous Sodium Hydroxide (parts by weight) | 25% Aqueous Ammonia (parts by weight) | Average Particle Diameter (nm) | Viscosity Before Storage (mPa·s) | Viscosity After Storage (mPa·s) | Storage Stability (Degree of Storage Stability, %) | Optical Density | Gloss |
| Ex. 1 | 1.79 | 0.37 | 113 | 2.80 | 3.84 | 137% | 1.28 | 41.8 |
| Ex. 2 | 1.79 | 0.37 | 110 | 2.79 | 3.28 | 118% | 1.30 | 44.0 |
| Comp. Ex. 1 | 1.83 | 0.32 | 111 | 2.74 | 5.90 | 215% | 1.20 | 30.1 |

It can be seen from the results shown in Table 2 that the water-based inks obtained in Examples 1 and 2 have excellent storage stability and high optical densities, and can give excellent gloss, with substantially no increase in viscosity of the inks even with the increase in the copolymerizing content of the styrenic macromer, as compared to that of Comparative Example 1.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aqueous dispersion for inkjet recording comprising colorant-containing water-insoluble vinyl polymer particles dispersed in water, wherein the water-insoluble vinyl polymer comprises a constitutive unit derived from a styrenic macromer (a) which has a polymerizable functional group at one end, wherein the styrenic macromer (a) has a number-average molecular weight of from 1000 to 5000 and a molecular weight distribution (weight-average molecular weight/number-average molecular weight) of from 1.0 to 2.5.

2. The aqueous dispersion according to claim 1, wherein the water-insoluble vinyl polymer has a weight-average molecular weight of from 10,000 to 200,000.

3. The aqueous dispersion according to claim 1, wherein the water-insoluble vinyl polymer is prepared by polymerizing a monomer composition comprising the styrenic macromer (a), a salt-forming group-containing monomer (b) and a polyoxyalkylene group-containing monomer (c).

4. The aqueous dispersion according to claim 3, wherein a copolymerizing content of the styrenic macromer (a) is from 18 to 50% by weight of the water-insoluble vinyl polymer.

5. The aqueous dispersion according to claim 1, wherein the colorant is a pigment.

6. A water-based ink for inkjet recording, comprising the aqueous dispersion of claim 1.

7. The aqueous dispersion according to claim 1, wherein the water-insoluble vinyl polymer comprises polymerized units of the styrenic macromer, a styrene, a methacrylic acid, octylpolyethylene glycol.

8. The aqueous dispersion according to claim 1, wherein the water-insoluble vinyl polymer comprises polymerized units of the styrenic macromer, an alkylene glycol, and a styrene.

9. A polymer obtained by drying the aqueous dispersion according to claim 1.

10. The aqueous dispersion according to claim 1, wherein the styrenic macromer has a number-average molecular weight of from 1,000 to 3,060.

11. The aqueous dispersion according to claim 1, wherein the styrenic macromer has a number-average molecular weight of from 2,000 to 4,000.

12. The aqueous dispersion according to claim 1, wherein the styrenic macromer has a molecular weight distribution of from 1.1 to 2.5.

13. The aqueous dispersion according to claim 1, wherein the styrenic macromer has a molecular weight distribution from 1.1 to 2.0.

14. The aqueous dispersion according to claim 1, wherein the styrenic macromer is present in an amount of from 5 to 50% by weight.

15. The aqueous dispersion according to claim 1, wherein the styrenic macromer is present in an amount of from 18 to 50% by weight.

16. The aqueous dispersion according to claim 1, wherein the water-insoluble vinyl polymer comprises reacted units of the styrenic micromer, a salt-forming group-containing monomer, and a polyoxyalkylene group-containing monomer.

17. The aqueous dispersion according to claim 1, wherein the weight-average molecular weight of the water-insoluble vinyl polymer is from 20,000 to 100,000.

18. The aqueous dispersion according to claim 1, wherein the styrenic macromer is a styrene homopolymer having a polymerizable functional group at one end.

* * * * *